Oct. 25, 1955 M. GERSHON 2,721,571
SHUT-OFF VALVE
Filed Dec. 21, 1954

INVENTOR.
MILTON GERSHON
BY *G. D. O'Brien*
ATTORNEYS

2,721,571
SHUT-OFF VALVE

Milton Gershon, Morristown, N. J., assignor, by mesne assignments, to the United States of America as represented by the Secretary of the Navy Application December 21, 1954, Serial No. 476,868

1 Claim. (Cl. 137—75)

(Granted under Title 35, U. S. Code (1952), sec. 266)

The present invention relates to valves for fluid flow systems and has more particular reference to a fast acting, one-shot, shut-off valve for effecting the sudden stoppage of fluid flow through a conduit.

In various applications, such as the hydraulic systems of certain rockets, it is necessary to effect the sudden stoppage of fluid flow through the system by remote or automatic actuation of a valve. To this end the present invention provides a shut-off valve wherein a valve member is normally retained in an open position by means of a retaining pin, and is, upon detonation of an explosive squib acting to retract the pin, moved into sealing engagement with a valve seat under the action of a compression spring.

In accordance with the foregoing, an object of this invention is to provide an improved rapid action, one-shot, shut-off valve for use in fluid flow systems.

Another object of the invention is to provide an improved shut-off valve as in the foregoing wherein operation thereof is initiated by detonation of an explosive squib.

And a further object of the invention is the provision of a shut-off valve comprising a valve member which is retained in an open position by means of releasable latch means and is, upon detonation of an explosive squib to effect release of the latch means, moved in the direction of fluid flow into sealing engagement with a valve seat under the action of a compression spring.

Figure 1:
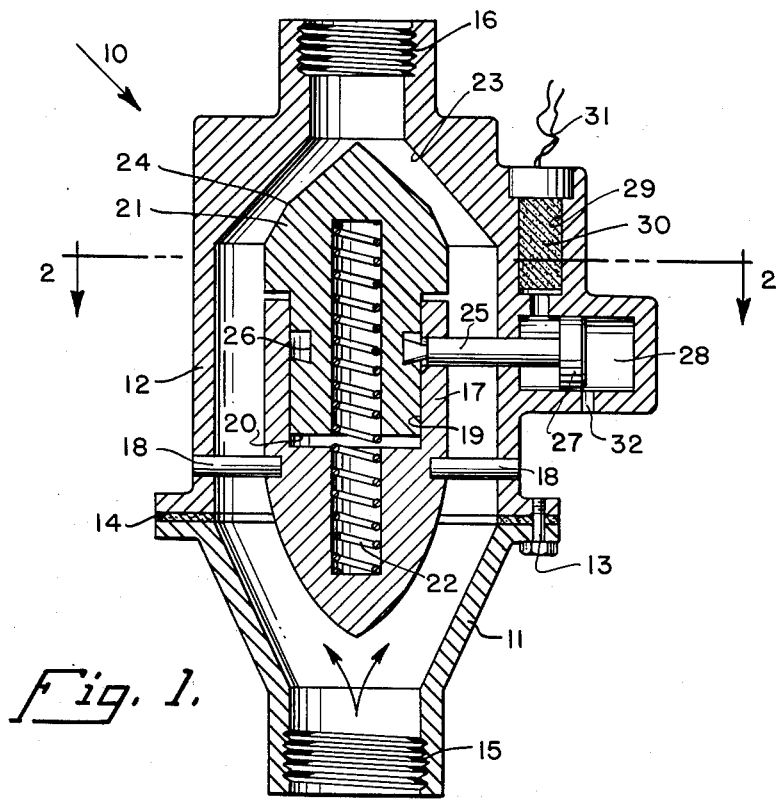
Figure 2:
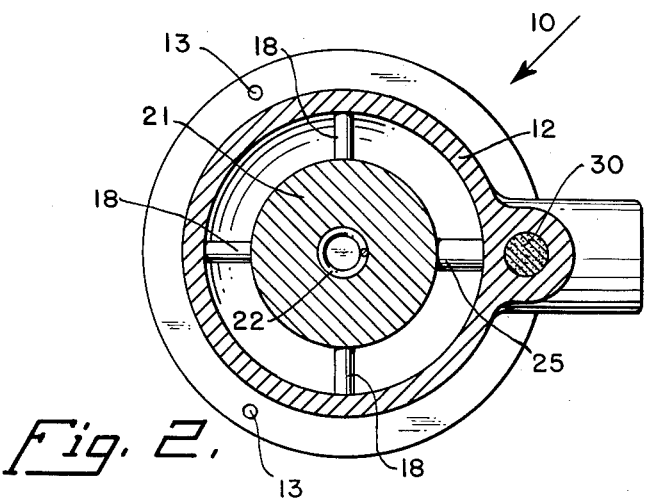

Other objects and many of the attendant advantages of the invention will become apparent as the same becomes better understood from the following detailed description had in conjunction with the annexed drawings wherein:

Fig. 1 is a longitudinal sectional view of the valve of the present invention; and Fig. 2 is a transverse sectional view taken substantially along line 2—2 of Fig. 1.

Referring now to the drawings, 10 denotes the casing of the present valve which casing comprises two sections 11 and 12, the latter being joined into an integral unit as by means of bolts 13 passing through flanges formed on the sections, as shown. Suitable gasket means 14 may be disposed between the sections, if desired. Casing 10 has internally threaded portions 15 and 16 formed at the opposite ends thereof whereby the valve may be connected in a fluid flow system, the direction of fluid flow being as indicated by the arrows in Fig. 1. Disposed in and centrally of the flow passage through casing 10, is a cylindrical support member 17 which is retained in position by means of a plurality of pins 18, or the like, fixed to the support member and to the valve casing 10 as shown. Support member 17 is of substantially smaller diameter than the interior of the valve casing whereby to define an annular flow passage, as shown more clearly in Fig. 2, and has its upstream end substantially conical shaped so as to give rise to the smooth flow of fluid therearound. Formed in and opening through the downstream end of support member 17 is a bore 19 in which is slidably disposed the stem 20 of a valve body 21. A compression spring 22, abutting the valve body and support member, acts to urge the valve body toward a conical shaped valve seat 23, formed at the downstream end of the casing 10. Valve body 21 is formed at its end with a pair of conical surfaces of different apex angles whereby to form, at the intersection of those surfaces, a circular edge portion 24 which, in the closed position of the valve body, sealingly engages the conical valve seat 23. If desired, valve body 21 may be made separate from and secured to valve stem 21 and may be constructed of some suitable relatively soft or resilient nonmetallic material whereby a tight closure of the valve may be assured without the necessity of finely machined surfaces. Valve body 21 is normally retained in spaced relation to the valve seat 23 by means of a latching device comprising a pin 25 which slidably extends through an opening in the wall of the bore 19 in support member 17 with its end projecting into an annular channel 26 provided in stem 20 of the valve body. The other end portion of pin 25 extends slidably through the wall of casing 10 and has formed on its extremity a piston 27 which is movable in a cylinder 28 formed in casing 10. Communicated with cylinder 28, at the underside of piston 27, is a squib chamber 29 having an explosive squib 30 disposed therein. Electrical leads 31 provide for detonating of the squib. A port 32 communicates the portion of the cylinder 28, above piston 27 when the latter is in its lowermost position shown, to atmosphere.

The operation of the present valve is as follows. Prior to actuation of the valve, the parts will be as shown whereby fluid may enter the upstream end of the casing, flow through the annular space between support member 17 and casing 10, and be discharged through the annular space between valve body 21 and valve seat 23. When it is desired to stop the flow of fluid, squib 30 is detonated by the application of electrical current to the leads 31. The gases generated by the burning squib will pass into cylinder 28 and drive the piston 27 to the right whereby pin 25 will be withdrawn from the channel 26 in valve stem 20 and compression spring 22 will drive the valve body 21 into sealing engagement with valve seat 23. Such movement of the piston 27 wil uncover port 32 whereby the excess squib gases will be vented to atmosphere. As shown in Fig. 1, the inner end of pin 25 is reversely tapered and the upstream wall of annular channel 26 is undercut to mate with the reverse taper on pin 25.

The reversely tapered inner end portion on pin 25 and the undercut wall of annular channel 26 function to retain pin 25 against accidental movement out of latching engagement with valve stem 20. Thus, to effect withdrawal of pin 25 from channel 26, it is necessary that valve stem 20 be cammed downwardly, as viewed in Fig. 1, against the spring 22 whereby accidental withdrawal of pin 25 is prevented. To provide further assurance against accidental withdrawal of pin 25 and to provide an indication as to whether or not the valve has been inadvertently closed, if such be desirable or necessary, a shearable lock wire (not shown) or other shearable means may extend through piston 27 and the wall of cylinder 28.

Obviously, many modifications are possible in the light of the above teachings. It is therefore to be understood that within the scope of the appended claim, the invention may be practiced otherwise than as specifically described herein.

What is claimed is:

A normally open rapid action shut off valve for fluid flow systems, comprising; a valve casing having an inlet at one end and an outlet at its opposite end, an annular valve seat disposed adjacent the outlet, a support member disposed within and affixed to the casing between the inlet and valve seat providing an annular flow passage therearound, the support member having a circular bore therein with an open end facing the valve seat, a valve body having a valve seat engaging portion and a stem portion, the stem portion being slideably disposed within the bore, the valve body and support member being provided with axially aligned bores, a compression spring disposed within the axially aligned bores urging the valve body in a direction toward the seat, the stem portion having an annular groove therein, a slideable latch pin extending radially through the casing and support member having its inner end disposed within the groove and retaining the seat engaging portion spaced from the seat, the groove and inner end being so shaped that outward radial movement of the pin moves the valve body away from the seat against the urge of the spring, whereby the spring, groove and inner end serve to prevent unauthorized disengagement of the inner end from the groove, a piston affixed to the outer end of the pin, the piston being disposed within a cylinder carried on the outside of the casing, an explosive squib disposed within a chamber carried by the casing to provide gas under pressure, means communicating the chamber with the cylinder, and means communicating the cylinder with ambient atmosphere for bleeding gas to the latter.

References Cited in the file of this patent

UNITED STATES PATENTS

| 1,882,700 | Allen | Oct. 18, 1932 |
| 2,397,518 | Allison | Apr. 2, 1946 |
| 2,626,633 | Wilson | Jan. 27, 1953 |

FOREIGN PATENTS

| 316,565 | Germany | Nov. 29, 1919 |